US009435660B2

(12) United States Patent
Nesbitt (10) Patent No.: US 9,435,660 B2
(45) Date of Patent: Sep. 6, 2016

(54) SYSTEMS AND METHODS FOR INITIATING MAPPING EXIT ROUTINES AND RATING HIGHWAY EXITS

(71) Applicant: MapQuest, Inc., Denver, CO (US)

(72) Inventor: David W. Nesbitt, Port Deposit, MD (US)

(73) Assignee: MapQuest, Inc., Denver, CO (US)

( * ) Notice: Subject to any disclaimer, the term of this patent is extended or adjusted under 35 U.S.C. 154(b) by 118 days.

(21) Appl. No.: 14/055,202

(22) Filed: Oct. 16, 2013

(65) Prior Publication Data
US 2015/0106011 A1    Apr. 16, 2015

(51) Int. Cl.
G01C 21/34    (2006.01)
G01C 21/36    (2006.01)

(52) U.S. Cl.
CPC ....... G01C 21/3476 (2013.01); G01C 21/3415 (2013.01); G01C 21/3484 (2013.01); G01C 21/3679 (2013.01)

(58) Field of Classification Search
CPC .......... G01C 21/3415; G01C 21/3484; G01C 21/005; G01C 21/34; G01C 21/3667; G01C 21/28; G01C 21/3476; G01C 21/3679
USPC ......................................................... 701/412
See application file for complete search history.

(56) References Cited

U.S. PATENT DOCUMENTS 6,298,304 B1 * 10/2001 Theimer ...................... 701/412
6,498,986 B1 * 12/2002 Kurtzberg et al. ........... 701/423
6,542,812 B1 *  4/2003 Obradovich et al. ......... 701/426

FOREIGN PATENT DOCUMENTS

| JP | 2006258710 |  | 9/2006 |
| JP | 2006258710 | A * | 9/2006 |
| JP | 2012057955 | A | 3/2012 |
| WO | WO 2008/152690 | A1 | 12/2008 |

OTHER PUBLICATIONS

International Search Report and Written Opinion issued in corresponding International Application No. PCT/US2014/060603, mailed Feb. 4, 2015 (10 pages).

* cited by examiner

*Primary Examiner* — Behrang Badii
*Assistant Examiner* — Daniel L Greene
(74) *Attorney, Agent, or Firm* — Bookoff McAndrews, PLLC (57) ABSTRACT

Systems and methods are provided for inferring a user's intent to stop at a predefined location or breakpoint along a predetermined route, such as an exit along a highway, and to enable users to report back to systems maintaining exit or breakpoint Point of Interest (POI) data. An application executing on a user's mobile device may infer or query the user's intent upon detecting a deviation away from the route and to use this as a "check-in" at a predefined location corresponding to the point of deviation. Then further check-ins and ratings at amenities/locations associated with the exit can also be used to enhance the rating and popularity of the predefined location (e.g., highway exit) itself. The ratings and popularity of highway exits provide relevant content related to the highest rated or most popular breakpoints located along their route of travel.

20 Claims, 8 Drawing Sheets

SYSTEMS AND METHODS FOR INITIATING MAPPING EXIT ROUTINES AND RATING HIGHWAY EXITS

TECHNICAL FIELD

The present disclosure relates generally to location based services for mobile devices, and more particularly, to providing mapping information and recommendations for points of interest to a user of a mobile device based on the geographic location of the user or the user's mobile device.

BACKGROUND

In recent years, the use of electronic maps and mapping applications has grown significantly. Such mapping applications may be executable at various types of user devices. Examples of such devices include, but are not limited to, an onboard navigation system in a vehicle, a dedicated portable Global Positioning System (GPS) device, or other type of mobile computing device, e.g., a smartphone. The displayed electronic maps often convey information related to roads, traffic, buildings, landmarks, terrain, and other geographic locations or regions of interest. Some electronic maps may be interactive, allowing users to view, for example, a digital map of a particular location (e.g., specific address, city, state, country, etc.) and the surrounding locations. Some mapping applications may also include route guidance features allowing users to receive route information or driving directions to a particular address based on each user's current geographic location, as derived through GPS or other location detecting means.

Interactive maps may also provide information about various points of interest (POIs) at or near a location selected or specified by a user. A POI may be, for example, a specific business, destination, or attraction that is useful or interesting to an individual or a group of individuals, or that the individual or the group may want to visit. By way of example, POIs on a map display may represent gas stations, rest areas, hotels, restaurants, museums, hospitals, historical sites in a specific geographic area, houses for sale, etc. A POI may also correspond to a movie theater showing a particular film, a restaurant that serves a specific type of food, such as pizza, etc.

Electronic maps, either interactive or non-interactive, may be used for planning or taking regular trips to the same location (e.g., daily commuting from home to work), new short-distance trips to unfamiliar locations, long-distance vacation road-trips, or any other type of travel. For example, a user may use an electronic mapping application executable at the user's device to input origin and destination locations and obtain routing directions from and to the locations. Mapping service providers also may track a user's location using GPS or other location detecting means coupled to a user's electronic device. Based on this location information, the electronic maps may provide users with real-time information, such as live traffic information and dynamic routing adjustments for a predetermined or prescribed route of travel.

In a conventional mapping or GPS-based navigation application, when a user deviates from a prescribed route, the application generally attempts to reroute the user back onto the same path heading to the final destination. In some cases, the user may not be interested in being immediately rerouted back onto the same path, and instead intends to stop at a point of interest located nearby for a particular reason including, for example, gas, food, lodging, coffee, rest, etc. For example, during a road trip, a user might intentionally take a highway off-ramp for a rest stop or other reason and be frustrated by a mapping service continually recommending that the user get right back on the highway. However, conventional mapping applications or services do not provide a way to identify such situations or assist the user by, for example, providing the user with helpful information related to possible points of interest that may be located near the user's current location, i.e., at the exit.

SUMMARY OF THE DISCLOSURE

Embodiments disclose systems and methods for identifying points of deviation along a route of travel. According to certain embodiments, one computer-implemented method for identifying deviation points along a route of travel, includes monitoring a current location of a mobile device of a user traveling along a portion of a predetermined route toward a specified destination location. A point of deviation away from the predetermined route is then detected based on the monitoring step. Information related to one or more points of interest associated with the detected point of deviation is obtained and routing options are provided to the user via a display of the mobile device based on the obtained information.

According to certain embodiments, systems are disclosed for identifying deviation points along a route of travel. One system includes a memory having processor-readable instructions stored therein; and a processor configured to access the memory and execute the processor-readable instructions, which when executed by the processor configures the processor to perform a plurality of functions, including functions to: monitor a current location of a mobile device of a user traveling along a portion of a predetermined route toward a specified destination location; detect a point of deviation away from the predetermined route based on the monitoring step; obtain information related to one or more points of interest associated with the detected point of deviation; and provide routing options to the user via a display of the mobile device based on the obtained information.

According to certain embodiments, a non-transitory computer readable medium is disclosed as storing instructions that, when executed by a computer, cause the computer to perform functions to: monitor a current location of a mobile device of a user traveling along a portion of a predetermined route toward a specified destination location; detect a point of deviation away from the predetermined route based on the monitoring step; obtain information related to one or more points of interest associated with the detected point of deviation; and provide routing options to the user via a display of the mobile device based on the obtained information.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

The present disclosure is directed to overcoming one or more of the above referenced issues. Specifically, the present disclosure is directed to systems and methods for inferring a mobile device user's intent to stop along a predetermined or prescribed route of travel in order to use amenities or points of interest (POIs) located along the predetermined route. Upon detecting that the user has deviated away from the predetermined route, an application executable at a user's mobile device may automatically infer or query the user's intent to stop at any of the nearby POIs.

In an example, the predetermined route may be based on, for example, directions generated by a navigation or route planning feature of a mapping application or service executable at the user's mobile device. A portion of the predetermined route of travel may be along, for example, a highway and the detected point of deviation may be, for example, an exit location or off-ramp along the highway. Further, the POIs may be associated with any particular location, such as an exit, off-ramp, town, city, etc. When the user in this example exits a portion of the highway coinciding with the predetermined route of travel, a mobile application on the user's device may query the user in order to confirm that the user intends to stop at one or more POIs that may be located near the exit location. Further, such an inferred "exit action" by the user may trigger a "check-in" at the particular highway exit or point of deviation along the prescribed route. The mobile application may then provide the user with routing information related to one or more POIs associated with the exit or deviation point detected during the user's current or active route of travel. Further check-ins and ratings of amenities or POIs associated with the exit can also be used to enhance the rating and popularity of the exit location itself. As will be described in further detail below, the ratings and popularity of highway exits (or other predefined points of deviation) can then be displayed in applications to help guide users to the "best" or most popular exits (or "break points") along a current path of travel. Such ratings may also be used to provide users with targeted content related to specific exits and amenities at the exits.

While the examples provided herein may be described in the context of active routes of travel along a highway and highway exit locations, it should be noted that the present disclosure is not intended to be limited thereto. For example, the techniques described herein may be used to provide routing information related to POIs associated with a predefined point of deviation that may be detected along any type of active route of travel.

Reference will now be made in detail to the exemplary embodiments of the disclosure, examples of which are illustrated in the accompanying drawings. Wherever possible, the same reference numbers will be used throughout the drawings to refer to the same or like parts.

Figure 1:
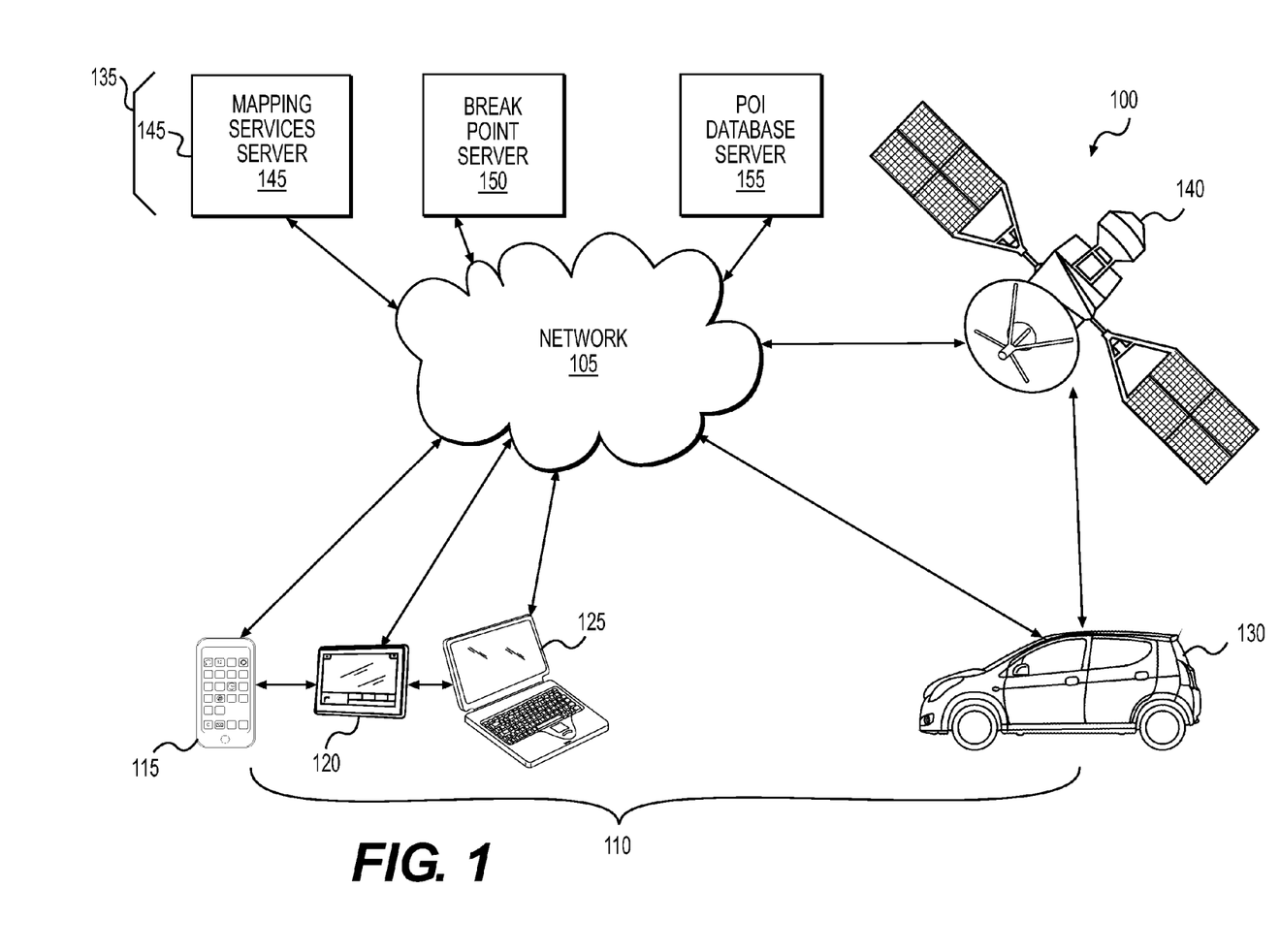
FIG. 1 is a block diagram of an exemplary communications and mapping system suitable for practicing an embodiment of the present disclosure.

FIG. 1 is a schematic diagram of an exemplary communication system 100 suitable for practicing the various embodiments of the present disclosure. As shown in FIG. 1, system 100 includes user devices 110, which may be, for example and without limitation, a mobile device 115 (e.g., mobile phone, personal digital assistant, tablet computer), a GPS device 120, a notebook or laptop computer 125, or a navigation system of a vehicle 130 (also referred to herein as "vehicle navigation system 130"). Also, as shown in FIG. 1, user devices 110 are each communicatively coupled with one or more servers 135, including a mapping services server 145 (also referred to herein as "mapping server 145"), a break point server 150 and a POI database server 155, via an electronic network 105.

Network 105 may be any type of electronic network or combination of networks used for communicating digital content and data between various computing devices. Network 105 may be, for example, a local area network, a medium area network, or a wide area network, such as the Internet. While only user devices 115, 120, and 125 are shown in FIG. 1, system 100 may include any number of user devices. Also, while only mapping server 145, break point server 150, and POI database server 155 are shown in FIG. 1, it should be understood that system 100 may include additional servers as desired for a particular implementation.

In the example shown in FIG. 1, mobile device 115 may be a smartphone, a personal digital assistant ("PDA"), a tablet computer, or other type of mobile computing device, such as a device having a touchscreen display. Mobile device 115 and laptop computer 125 may each be equipped with or include, for example, a GPS receiver for obtaining and reporting location information, e.g., GPS data, via network 105 to and from any of servers 135 and/or one or more GPS satellites 140. GPS device 120 may be a dedicated GPS navigation device having an integrated GPS receiver for exchanging location information with GPS satellite(s) 140 for purposes of tracking a current geographic location of GPS device 120 and its user. GPS device 120 may be a portable or handheld GPS device. Vehicle navigation system 130 may be implemented as, for example, a GPS based in-dash navigation system integrated with the vehicle 130. Such an in-dash navigation system may provide various functions, including a navigation function, via a center console display installed within the vehicle.

However, it should be noted that each of user devices 110, including mobile device 115, GPS device 120, computer 125, and/or vehicle navigation system 130, may be implemented using any type of electronic device configured to send and receive data, including location data (e.g., in the form of latitude and longitude coordinates), to and from servers 135 over network 105. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Furthermore, it should be noted that any of various techniques may be used to derive geographic location information for any of user devices 110, particularly in cases where GPS data may not be available, for example, in urban canyons or other locations where line-of-sight to GPS satellites may not be feasible. Examples of other techniques that may be used for deriving location information for any of user devices 110 include, but are not limited to, cell identification (e.g., using Cell ID), cellular tower triangulation, multilateration, Wi-Fi, or any other network or handset based technique for deriving location information for a mobile device. The various user devices 110 may also communicate with each other by any suitable means (e.g., via Wi-Fi, radio frequency (RF), infrared (IR), Bluetooth, Near Field Communication, or any other suitable means) to send and receive location and other information. For example, a mobile device 115 may communicate with GPS device 120 or vehicle navigation system 130.

As shown in FIG. 1, each user device 110 may be in communication with one or more external servers, such as mapping services server 145, break point server 150, and POI database server 155 via, for example, the network 105. The external servers 145, 150, 155 may be the source of any routing/mapping and/or location information that may be used by the mobile application or other client software executable at each user device 110. In addition, the mapping services server 145 may provide data from other users, traffic reports, weather reports, police reports, and/or any other source of relevant information and the POI database server 155 may include reviews of POIs, details about POIs and/or any other relevant information related to a POI or predefined geographic location. The mapping services server 145 may receive information from the other servers 150, 155 and process the information for display on each user device 110. The processed information may be communicated to the break point server 150 or any of user devices 110, via the network 105. For example, a mobile mapping application executable at a user's device may store the received processed information in a memory of the device and/or present the information to a user via a display of mobile device 115, GPS device 120, computer 125, or vehicle navigation system 130, as will be described in further detail below.

Each of servers 135, including mapping server 145, break point server 150, and POI database server 155 may each represent any of various types of servers including, but not limited to a web server, an application server, a proxy server, a network server, or a server farm. Each of servers 135 may be implemented using, for example, any general-purpose computer capable of serving data to other computing devices including, but not limited to, user devices 110 (including mobile device 115, GPS device 120 and computer 125) or any other computing device (not shown) via network 105. Such a general-purpose computer can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. Each server may also have multiple processors and multiple shared or separate memory components that are configured to function together within, for example, a clustered computing environment or server farm.

In an example, each of user devices 110 may be configured to execute a mobile client application for providing various functions of a mapping service hosted at mapping server 145. Examples of such functions may include, but are not limited to, viewing and manipulating digital maps, route planning and navigation, and obtaining information related to various POIs. Such POIs may include, for example and without limitation, landmarks, buildings, public parks, museums, restaurants, gas stations, or any other predefined geographic location associated with a public or private enterprise. The client application executable at each user device 110 may be configured to process and execute instructions and save data in memory. The client application may also be configured to provide the various mapping functions to the user through a graphical user interface (GUI) presented via a display, e.g., capacitive touch-screen display, coupled to each user device 110. The client application executable at each user device may be a standalone mobile application or may be configured to execute within, for example, a web browser based on web page data loaded within the browser or similar application executable at each of user devices 110.

In a further example, the above-described mapping client application and/or mapping service hosted at mapping server 145 may be configured to communicate with break point server 150 or POI database server 155 via network 105 for purposes of sending and receiving information related to exits located along a highway and POIs associated with each exit. Each of break point server 150 and POI database server 155 may be communicatively coupled to, for example, an exit POI database (not shown), which may be used to store a mapping of highway exits and associated POIs. The POIs associated with an exit may include, for example, POIs that may be located within a predetermined distance or radius of the exit or within a specified drive time from the exit.

As will be described in further detail below, such an exit POI database may be used (e.g., by break point server 150 and/or POI database server 155) to store and retrieve data related to a particular highway exit and/or one or more POIs associated with the exit to and from the exit POI database. The data associated with an exit may include, for example, a popularity score or ranking for each exit. The popularity score or ranking for an exit may be based on, for example, the number of times the exit has been used as a point of deviation away from a prescribed route for travelers along the highway or the number and/or variety of POIs associated with the particular exit. A popularity score or ranking may also be associated with individual POIs and may be used as a factor in calculating the popularity score for the exit. An individual POI ranking may be based on, for example, user ratings or data quantifying user reviews associated with the POI. Such POI ranking data may be obtained from, for example, a third-party service that allows users to submit ratings or reviews of individual POIs.

To implement navigation features of the mobile application, each user device 110 may receive location data from one or more servers 135 via network 105 and/or satellites 140. Such location data may include information regarding a user's trip, such as a start or origin location, travel route, and a destination location. The mobile application may be any machine readable code for executing instructions, such as software, configured to be processed by each user device 110. The mobile application may have been downloaded via the network 105 and installed within a memory of each user device 110.

In an example, a predetermined route for a user traveling toward a destination location may be based on, for example, driving directions generated by a navigation or route planning feature of a mapping application or service executable at each user device 110 or at server 145. A portion of the predetermined route of travel may be along a highway and the mobile application may be configured to monitor the user's progress along the active route of travel and detect when the user deviates away from the highway by, for example, taking an off-ramp or exit off the highway for purposes of making an unscheduled stop at a POI located near the exit. When the mobile application in this example detects such a deviation from the predetermined route, the application may automatically infer that the mobile user is exiting the highway for a particular reason (e.g., to stop at a particular POI located nearby) and accordingly, provide routing information related to popular POIs that are known to be located near the exit location.

Further, the application may be configured to report to an exit rating service hosted at, for example, break point server 150, the user's deviation from the prescribed route via the exit. The exit rating service may be configured to track the number of times the exit is used as a deviation point by any number or subset of users and accordingly, increase a popularity score or rating associated with the exit location based on the number of times it is used. As will be described in further detail below, the mobile application may communicate with one or more servers via network 105 to obtain and report relevant data related to the exit location and any associated POIs.

While the examples provided herein are described in the context of highway exits and associated POIs, it should be noted that the techniques described herein are not limited thereto and that these techniques may be extended to any predetermined geographic location and associated POIs. Such a predetermined geographic location may be, for example, the location of a shopping mall and the associated POIs may correspond to stores located at or near the mall. In an example, a database coupled to POI database server 155 may be used to store a mapping between popular POIs located in a particular area of a city, e.g., a town center. The mobile application executable at the user's device in this example may communicate with one or more of mapping server 145, break point server 150, and/or POI database server 155 via network 105 for purposes of inferring a deviation by the user away from a predetermined route of travel through the city (or town center) and display information related to various POIs that may be located near the point of deviation.

FIGS. 2A-2D illustrate different views of an exemplary graphical user interface (GUI) 200 for a mapping application executable at a mobile device of a user. The mobile device may be implemented using, for example, any of user devices 110, e.g., mobile device 115, GPS device 120, computer 125, or vehicle navigation system 130, of FIG. 1, as described above. However, it should be noted that the techniques described below in reference to the examples illustrated in FIGS. 2A-2D are not limited to user devices 110 or communication system 100 of FIG. 1, and that these techniques may be applied using any type of mobile computing device and communication system. The functionality provided by the mapping application may include, for example, active route guidance in the form of turn-by-turn directions from a specified origin location to a destination location based on user input. The origin and destination locations may have been provided by the user via input fields displayed in an initial view (not shown) of GUI 200. The turn-by-turn directions from the origin to the destination may be provided by the mapping application to the user of the mobile device using GUI 200, as displayed via a graphical display of the mobile device. Additionally or alternatively, such directions may be provided by the application in the form of audio played through a speaker of the mobile device (or vehicle in the case of vehicle navigation system 130 of FIG. 1), e.g., as part of a voice-activated guidance feature.

Figure 2A:
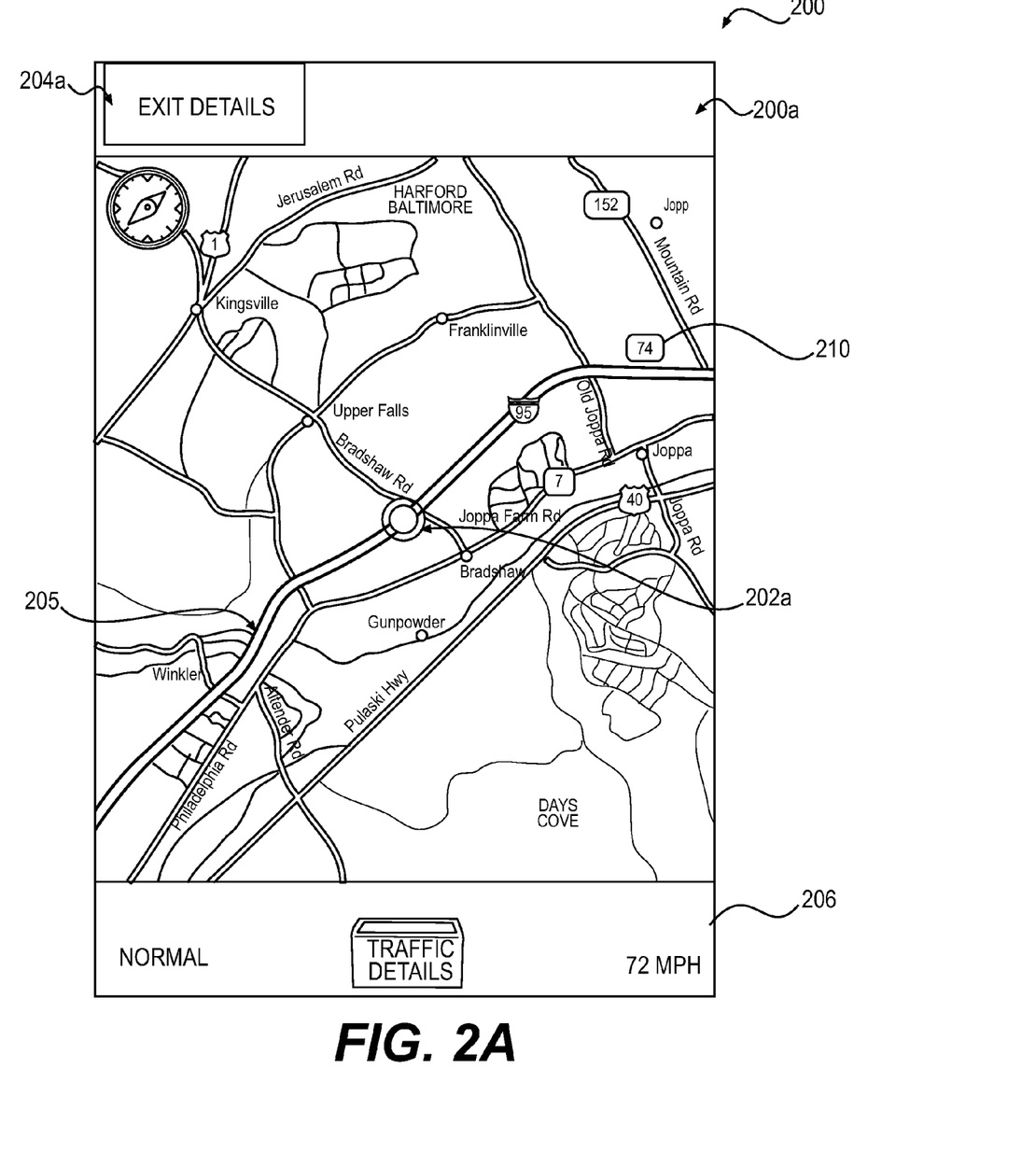
FIGS. 2A-2D illustrate different screenshots or views of an exemplary graphical user interface for a mapping application executable at a mobile device of a user.

FIG. 2A illustrates a view 200A of GUI 200 including a graphical representation of a digital map and the location of a mobile device user traveling (e.g., in a vehicle) along a predetermined route. As shown in FIG. 2A, a location indicator 202A may be used to represent a current location of the user (and user's mobile device) along a visual path 205 representing a portion of the predetermined route along which the user is currently traveling. In the example shown in FIG. 2A, the portion of the predetermined route corresponding to path 205 is a portion of a highway or public road.

The digital map, including location indicator 202A and any relevant map features, as shown in view 200A, may be periodically updated as the user progresses along the predetermined route or path 205. In addition to location indicator 202A corresponding to the current position of the mobile device user along path 205, an exit location indicator 210 corresponding to the location of a particular exit (e.g., exit number 74) may also be shown (e.g., as a graphical overlay) on the digital map displayed within view 200A.

Also, as shown in FIG. 2A, GUI 200 may be used to display relevant information including, but not limited to, traffic conditions and/or current rate of speed to the mobile device user via a portion 206 of GUI 200. Additionally, GUI 200 may include various user control elements, which the mobile device user can manipulate or select in order to control the information being displayed within the current view. For example, the user may select the button labeled "Traffic Details" within portion 206 of GUI 200 to change the displayed view 200A to different view (not shown), which may include additional details regarding the level of traffic, road conditions, and options for alternate routes that may be ahead of the user's current location along path 205.

Figure 2B:
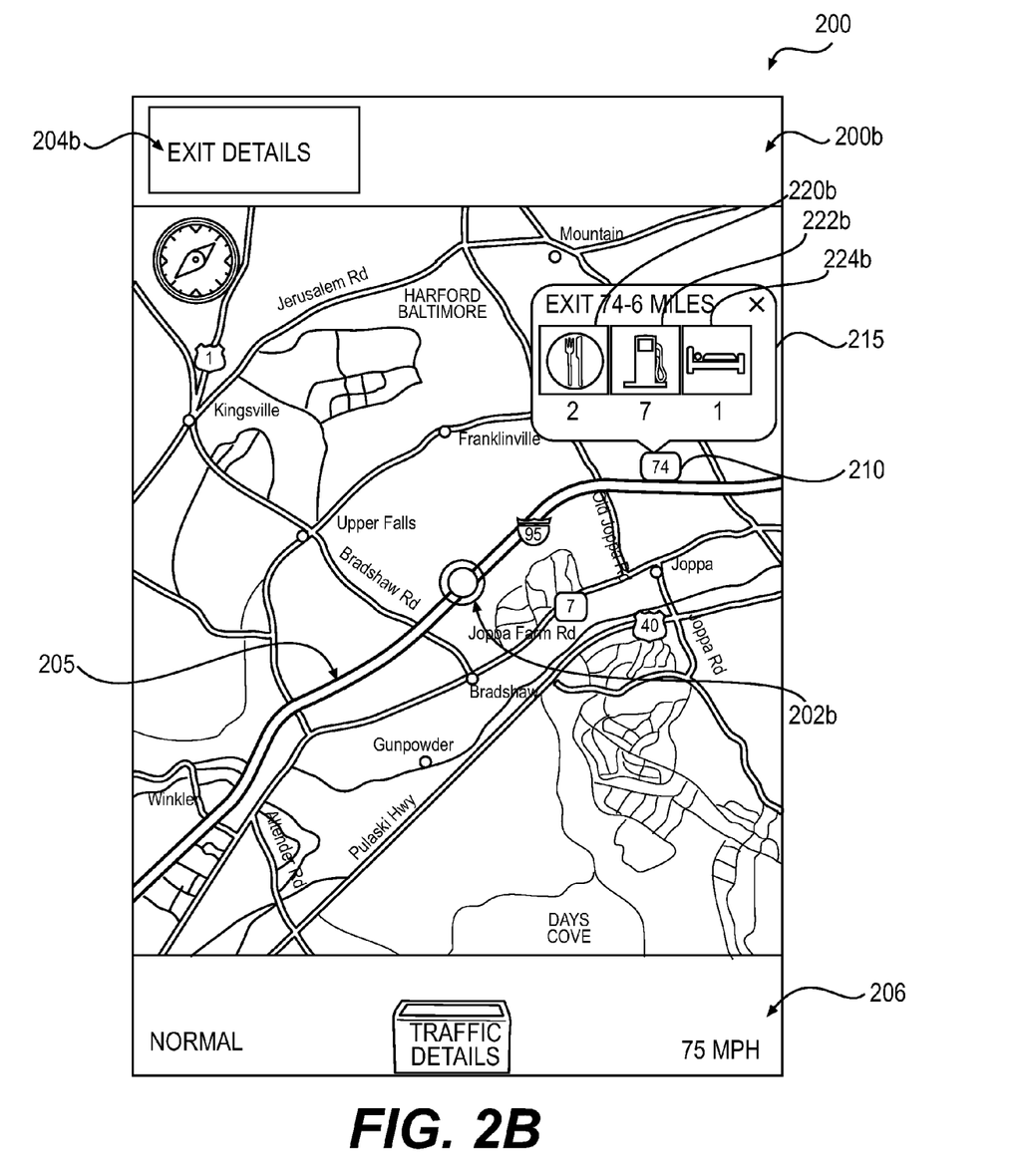

In a further example, the user may select a button 204A to view additional details related to an upcoming exit (e.g., exit 74) corresponding to exit location indicator 210. The user's selection of button 204A via GUI 200 may cause view 200A to change to a view 200B, as shown in FIG. 2B. View 200B is similar to view 200A, except that it includes a popup control 215 showing additional details related to various amenities or POIs associated with the exit (e.g., exit 74) corresponding to exit location indicator 210. Also, FIG. 2B shows that the user's position has advanced to the location indicated by indicator 202B. Alternatively, GUI 200 may be configured to change from view 200A to view 200B and display control 215 based on user input selecting exit location indicator 210 directly within view 200A. As shown in FIG. 2B, control 215 includes additional controls 220B, 222B, and 224B indicating the type and number of POIs associated with the particular exit location. In the example shown in FIG. 2B, control 220B may be selectable by the user for viewing additional information for the two restaurants associated with this exit location. Similarly, controls 222B and 224B may be selected by the user to view more detailed information related to the (seven) gas stations and (one) hotel, respectively, that may be associated with the exit location.

Figure 2C:
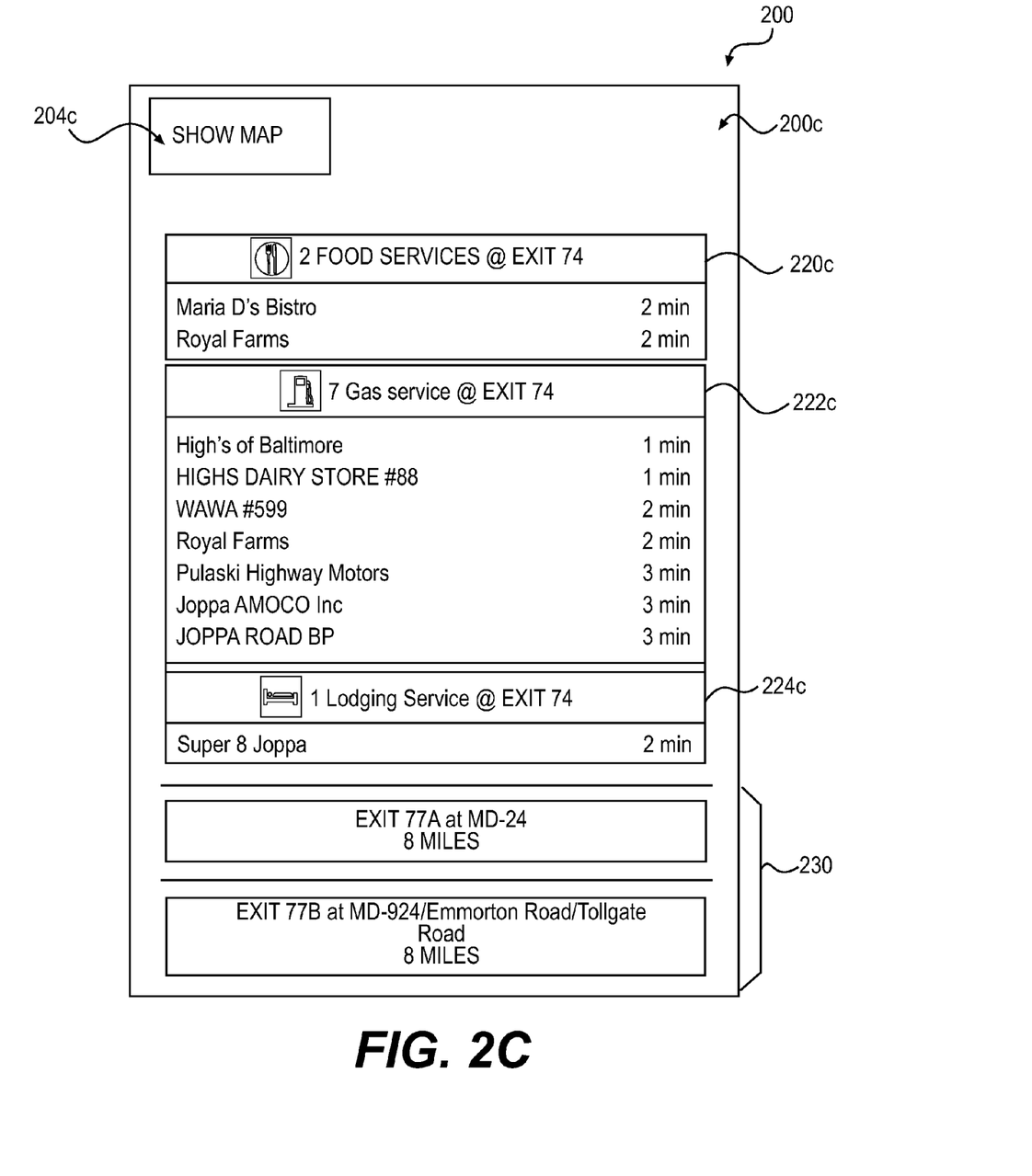

In an example, input from the user selecting either control button 204B or any of controls 220B, 222B or 224B in view 200B may cause the current view being displayed via GUI 200 to change to a view 200C, as shown in FIG. 2C. As shown in FIG. 2C, the information displayed in view 200C may be divided into different portions 220C, 222C, and 224C corresponding to the POIs associated with controls 220B, 222B, and 224B, respectively, as shown in view 200B of FIG. 2B. Also, as shown in FIG. 2C, view 200C may include a control button 204C enabling the user to switch back to a map view (e.g., view 200A or view 200B of FIGS. 2A and 2B, respectively).

It should also be noted that the techniques described herein are not intended to be limited to the user control elements, as described above and as shown in FIGS. 2A-2D. Further, it should be noted that any of various user control elements may be used with GUI 200 to invoke the functionality of the mapping service or application described herein, including, but not limited to, controls used to change the views of the digital map or any other relevant information that may be displayed for the user at the mobile device.

In an example, the mapping application may be configured to communicate with a mapping service (e.g., hosted at mapping services server 145 of FIG. 1, as described above) to obtain location information related to map features and POIs via a network (e.g., network 105 of FIG. 1, as described above). For example, the mapping application may request information related to POIs that are located within a predetermined distance or drive time from the user's current location, as indicated by location indicator 202A in view 200A. The mapping application also may be configured to obtain information related to traffic or road conditions that may be relevant to the user based on the current route of travel and location of the user (or user's mobile device). Such traffic and road information may be obtained from the mapping service or a third-party service provider, for example, a service provided by a local transportation authority affiliated with a state or municipality. As will be described in further detail below, such traffic information may be used as a parameter in inferring the reason for the user deviating from the predetermined route. This may include, for example, determining whether or not the user intends to make a stop at any of the POIs that may be associated with a point of deviation (e.g., highway exit).

In a further example, the mapping application may also obtain information related to predefined location points, e.g., highway exits, along the predetermined route or path 205. This information may be obtained from the mapping service or from a specialized exit POI database (e.g., coupled to POI database server 155 of FIG. 1), which may be used to store and retrieve information related to POIs that may be associated with, for example, a highway exit or other predefined "break point" location for travelers along the portion of the predetermined route (or highway in this example). For example, the POIs that may be associated with a particular highway exit may be POIs that are known to be within a predetermined distance of the exit location and accessible to travelers (e.g., with relative ease) by using the exit. Examples of such POIs may include, but are not limited to, gas stations, hotels, restaurants, shopping malls, public landmarks, or any other predefined geographic location that may be associated with a public or private enterprise.

The exit POI database in the above example may store an association between the highway exit and POI data corresponding to each of the POIs. The POI data may include, for example, a name or identifier for the POI, a type of category of the POI, and a location of the POI (e.g., in the form of a physical address, GPS coordinates, or other geographic location information). Additionally, the POI data for a particular POI may include a ranking or popularity score associated with the POI. As described above, individual POI rankings or scores may be based on user ratings or user reviews submitted for the respective POIs. Such POI ranking data may be obtained from, for example, a third-party service that allows users to submit ratings or reviews of individual POIs.

Figure 2D:
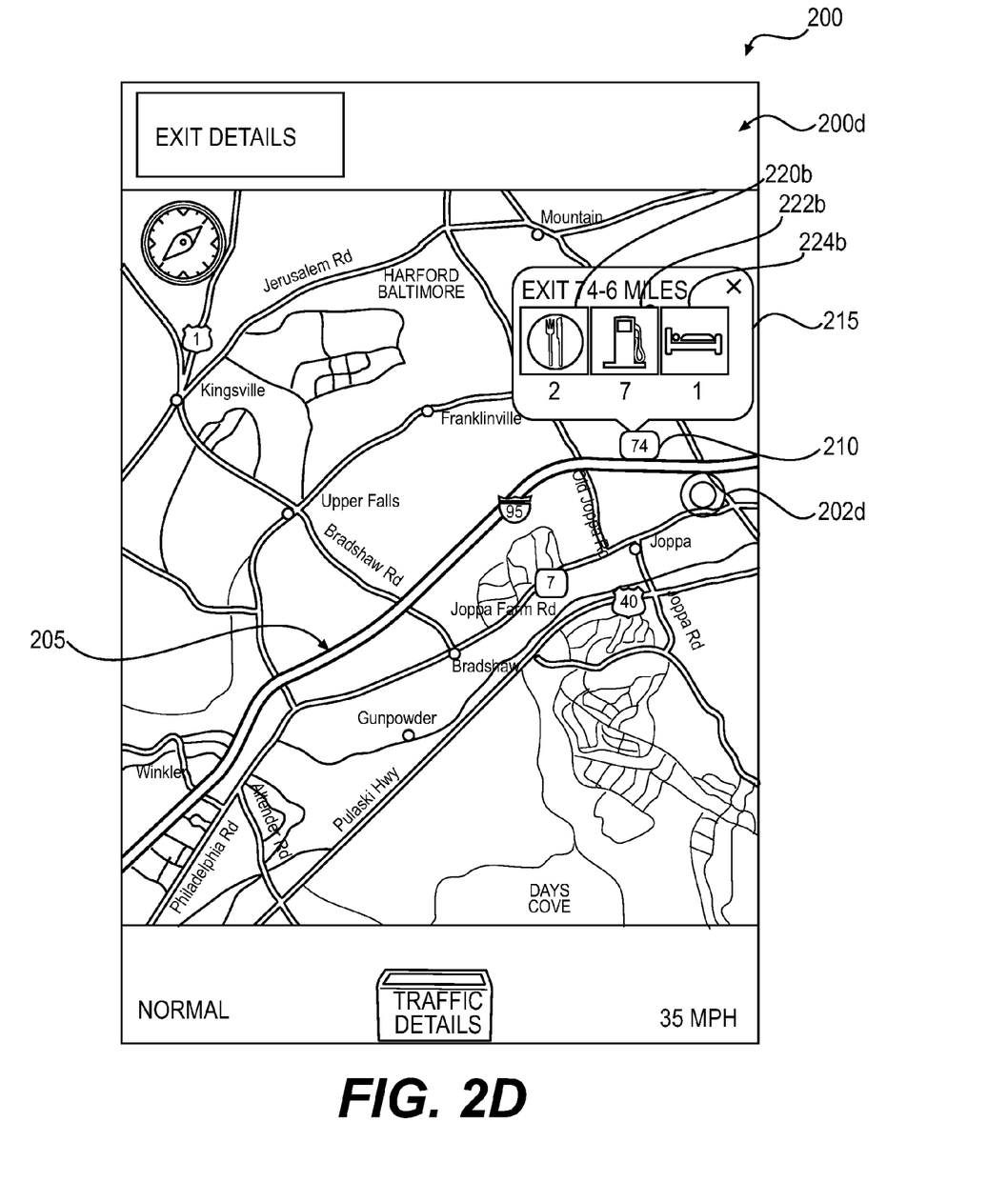

In an example, the mapping application executable at the user's mobile device may automatically infer that the user is deviating from the predetermined route, e.g., exiting a highway at an exit location. The mobile device user in this example may be traveling in a motor vehicle along the predetermined route. The mobile application executable at the user's device may track or monitor the current location of the user (and user's vehicle) as the user travels along the predetermined route toward a specified destination. As the application tracks the user's progress along the route, the user may decide to deviate from the route in order to stop at a POI located nearby, as illustrated by a view 200D of GUI 200 in FIG. 2D. The mobile application may then detect the point of deviation away from the active route on which the user was traveling. As shown in FIG. 2D, the current geographic location of the user (or user's mobile device) may be away from the predetermined path 205, as indicated by location indicator 202D. In some implementations, the mobile application may detect the point of deviation when the location of the user's mobile device is determined to be physically past or exceed a predetermined threshold distance from the predetermined path 205. The determination of whether the user's mobile device has exceeded the threshold distance may be based on the shortest distance measured between the current location of the user's mobile device and the nearest point located along the predetermined path 205. Thus, in the example shown in FIG. 2D, the location corresponding to indicator 202D may be a point located past a predetermined threshold distance away from the portion of the highway corresponding to path 205. In a further example, the mobile application may be configured to detect a deviation only after the user's mobile device is determined to deviate away from the predetermined path 205 for at least a predetermined threshold time period. This may help to reduce the chance of detecting an accidental deviation by the user away from the path, e.g., the user accidentally takes a wrong exit off the highway, in which case the user may quickly realize the mistake and reenter the highway at the next reentry point. Upon detecting the deviation, the application may obtain information related to one or more POIs associated with the detected point of deviation.

In an example, the active route of travel may have been along a highway and the point of deviation may be a highway exit. The mobile application in this example may detect that the deviation from the prescribed route has occurred near an exit location and that the last known location of the mobile device correlates to a highway road. Accordingly, when the path deviates from the current road near an exit location and the current road is determined to be a highway, the intention of the user to stop along a POI located near the exit may be inferred. The application may then initiate an exit POI service, which may provide the user with relevant information related to one or more POIs associated with the exit or point of deviation from the predetermined route (e.g., along the highway) on which the user was traveling.

As the user may not intend to stop at any POIs and may have taken the exit as an alternate route, e.g., due to traffic or other road conditions that the user may have observed while traveling along the prescribed route. Therefore, the application may query the user or request further routing instructions from the user. For example, a query or request may be displayed via GUI 200, e.g., within a separate view or dialog window. Alternatively, the application may use audio voice prompts or any other technique to query or request routing preferences from the user. The user may respond to the request by, for example, selecting a control button (also displayed via GUI 200) or by speaking the appropriate voice commands, depending on the particular implementation. If the user's response indicates that the user does intend to stop at nearby POI, the mobile application could pause any route guidance associated with the original route, e.g., along the highway, and provide tools to help the user select appropriate amenities, e.g., associated with an exit location. The application may, for example, provide an option for the user to have information obtained for one or more POIs associated with an exit be displayed via a display of the user's device. Popularity scores, ratings, etc. for individual POIs or amenities associated with the highway exit (or other predefined deviation or "break" point) may also be provided to assist and influence the user's decisions.

In an example, the application may automatically infer the user's intent to stop at a POI may be based on one or more factors related to the particular road on which the user was traveling and the particular point of deviation (e.g., highway exit). Such factors may include, for example and without limitation, the number and type of POIs associated with the exit as well as the road conditions at the time of the user's deviation from the route. In some implementations, the application may determine the total number of POIs associated with an exit or deviation point and initiate the exit POI service, including querying the user for additional routing preferences/instructions, only if the total number of POIs meets or exceeds a predetermined threshold quantity. For example, the threshold quantity may be one, and the application would not initiate the exit POI service if no POIs are associated with an exit location.

The mobile application in the above example may also use information about current traffic and road conditions along the predetermined route to infer that the exit action by the user was intentional and not due to, for example, traffic or road conditions, as previously noted. In addition, the application may use data related to the POIs associated with the exit. As described previously, such POI data may include, for example, a popularity score representing user ratings or reviews submitted for each of the POIs associated with an exit. Also, as described above, the popularity score or ranking for individual POIs may be used as a factor in calculating a popularity score for the exit itself. In some implementations, additional POI data, e.g., either stored at the user's mobile device or at a remote data store accessible to the mobile application, may include a record of prior inquiries made by the particular user with respect to POIs located near a known deviation point, e.g., highway exit location. Such additional POI inquiry data may be used to reduce the aforementioned threshold quantity required for inferring a deviation for an upcoming deviation point, e.g., an upcoming exit location along the highway.

In an example, the mobile application may calculate a probability representing the likelihood that the deviation away from the predetermined or prescribed route by the user was an intentional exit action, e.g., for purposes of stopping at a nearby POI or amenity associated with the particular deviation point or highway exit in the above example. Accordingly, the calculation may be based on, for example, different weighted scores applied to the aforementioned factors related to POIs and/or road or traffic conditions.

Once the application has inferred that an exit has been taken, the application can report the use of the exit, e.g., to the mapping service or an exit POI service, as described above. Such an exit POI service may be configured to increase the popularity or count of users stopping at the particular exit. The mobile application may also include tools that allow users to "check-in" and/or rate POIs visited once the highway is exited. The application may also provide users with a rating and/or review of the accessibility of a particular POI from the exit. This could be used to help track users' views of how relatively easy or accessible particular POI locations may be for highway travelers at a particular exit. Further, the popularity (e.g., how many times users exit the highway to stop at particular POIs) in addition to reviews associated with POIs at an exit can be used in mobile applications to assist users in planning where to stop and which POIs to visit while along their trip.

While the examples above have been described in the context of a client application executable at a mobile device, it should be noted that the systems and techniques disclosed herein are not intended to be limited thereto. Further, it should be noted that these systems and techniques may be implemented as a web service or application hosted at a server (e.g., mapping services server 145 of FIG. 1, as described above). In an example, the user's mobile device may send location data and requests for information to the server, and the server may be configured to process the data and requests in order to perform the various functions associated with the exit POI service, as described above. Such functions may include, for example, inferring the user's intent to deviate from a predetermined route based on data related to the POI(s) associated with a detected point of deviation (e.g., highway exit) and/or data representing traffic or road conditions.

Figure 3:
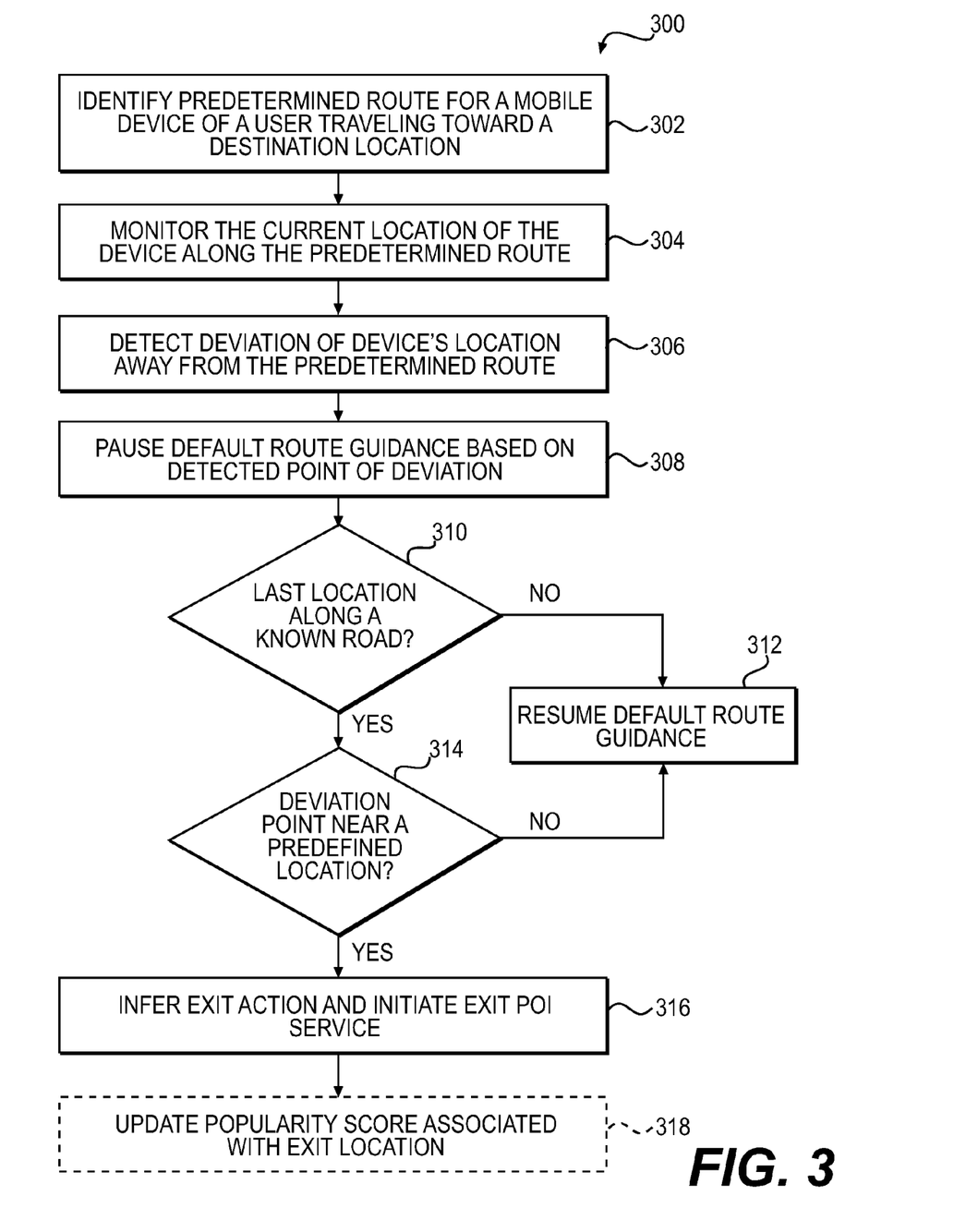
FIG. 3 is a process flow diagram of an exemplary method for initiating a highway exit POI service for a mobile device user.

FIG. 3 is a process flow diagram of an exemplary method 300 for initiating a highway exit POI service for a mobile device user. For discussion purposes, method 300 will be described using system 100 of FIG. 1, but method 300 is not intended to be limited thereto. Further, for ease of discussion, method 300 will be described using the example GUI 200 of FIGS. 2A-2D, as described above. However, method 300 is not intended to be limited thereto. As shown in FIG. 3, method 300 includes steps 302, 304, 306, 308, 310, 312, 314, 316, and 318. However, method 300 may include additional steps that may not be shown in FIG. 3 for ease of discussion. Also, method 300 may include fewer steps than those shown in FIG. 3, as one or more steps may be optional or multiple steps may be combined into a single step.

Method 300 begins in step 302, which includes identifying a predetermined route for a mobile device of a user traveling toward a destination location. The predetermined route may be based on, for example, directions generated by a navigation or route planning feature of a mapping application executable at the user's mobile device. However, in some implementations, such an application or service may be executed at a server, which may be configured to provide relevant information and features of the service via a web browser or other network interface at the mobile device. Further, a portion of the prescribed route of travel may be along a highway and the detected point of deviation may be an exit location along the highway.

In step 304, the current location of the mobile device is monitored as the user travels along the predetermined route. Step 304 may be performed by, for example, a mapping service hosted at a mapping server (e.g., mapping server 145 of FIG. 1, as described above) based on location data (e.g., GPS data) captured at the mobile device and transmitted periodically to the mapping server. Step 306 includes detecting a deviation of the device's location away from the predetermined route. Once such a point of deviation has been detected, any default route guidance features of the application that pertain to the predetermined route may be paused in step 308.

Method 300 then proceeds to step 310, which includes determining whether or not the last location of the mobile device was along a known road, e.g., whether the portion of the predetermined route on which the device was located prior to the detected point of deviation coincided with a known road, such as a highway or other public road. The location of the device may be derived from a GPS of the device and/or using any of various other well-known techniques for obtaining geographic location information or tracking the location of a mobile device.

If the last location was not along a known road (e.g., a highway), method 300 may proceed to step 312, in which default route guidance pertaining to the predetermined routed may be resumed. Such default route guidance may include, for example, rerouting the user back to the predetermined route. However, if the last location is determined to be along a known road, method 300 may proceed to step 314, which includes determining whether the detected point of deviation coincides with or is near (e.g., within a predetermined distance) of a predefined breakpoint location. Such a breakpoint may be, for example, the location of an off-ramp or exit along the highway. The highway exit may be known as a popular breakpoint for travelers along the particular portion of the highway. In some implementations, a popularity score may be associated with the highway exit. Such a popularity score may be calculated based on, for example, the number, variety, and/or accessibility of POIs that may be associated with the exit. Additionally or alternatively, the score may be based on individual popularity scores representing user ratings or reviews for the individual POIs associated with the exit location.

In some implementations, the detected point of deviation may serve as a check-in at the particular exit location. As described previously, such check-ins may be tracked by an exit POI service (e.g., hosted at breakpoint server 150 or POI database server 155 of FIG. 1, as described above) and further, used to enhance the rating and popularity of the exit location itself. The ratings and popularity of highway exits (or other predefined points of deviation) can then be displayed in applications to help guide users to the "best" or most popular exits (or break points) along a current path of travel. Such ratings may also be used to provide users with targeted content related to specific exits and amenities at the exits.

If the deviation point is determined (in step 314) to be near a predefined location (e.g., known highway exit or popular breakpoint), method 300 may proceed to step 316, in which an exit action by the user is inferred and an exit POI service is initiated. In some implementations, method 300 may also proceed to step 318, which includes updating the above-described popularity score associated with the exit or breakpoint location. Otherwise, method 300 may proceed to step 312, in which default route guidance for the initial predetermined route is resumed, as described above. The exit POI service will be described below with respect to the steps of method 400 of FIG. 4.

Figure 4:
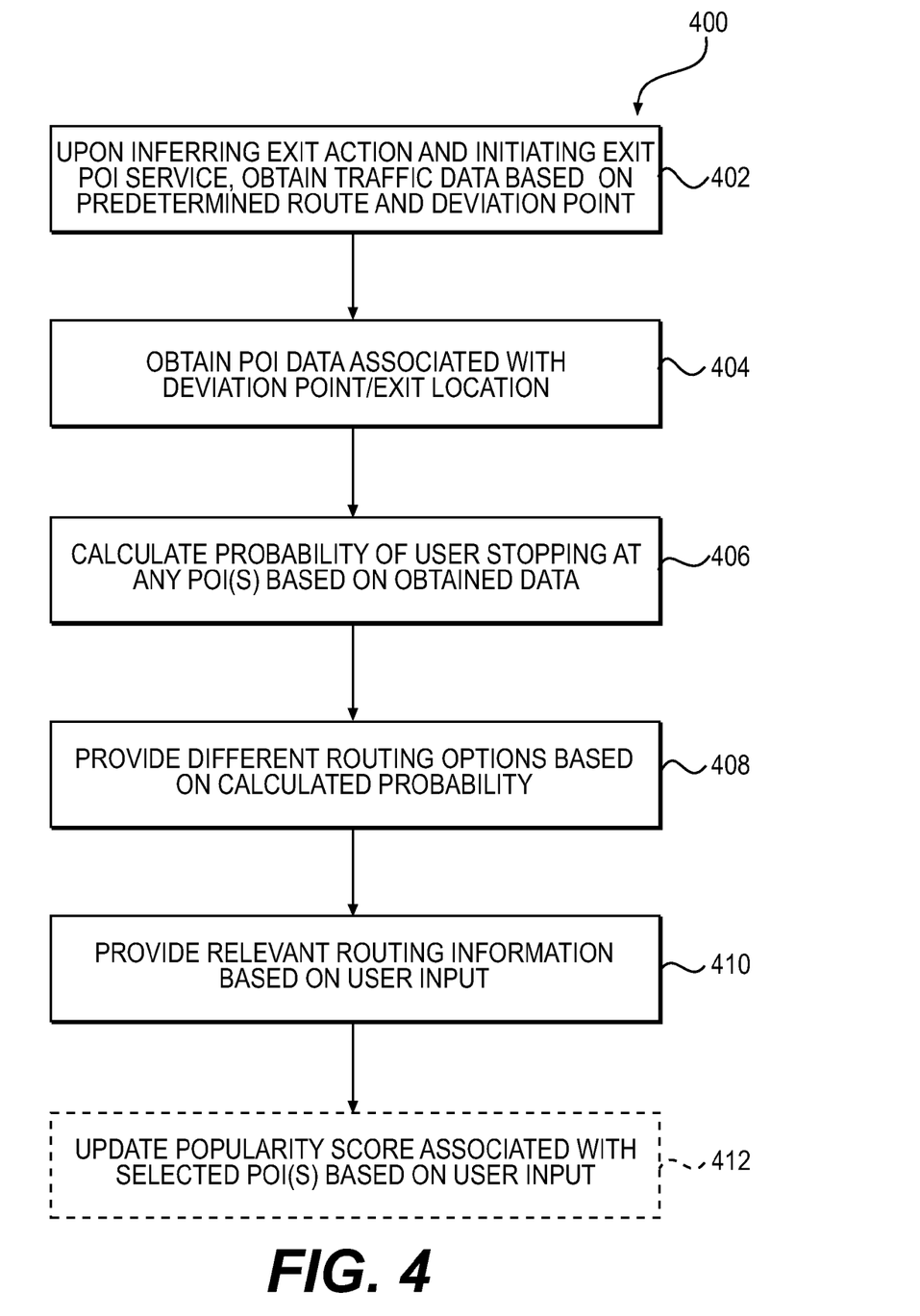
FIG. 4 is a process flow diagram of exemplary method for providing routing recommendations using the highway exit POI service initiated by the method of FIG. 3.

FIG. 4 is a process flow diagram of exemplary method 400 for providing routing recommendations using the highway exit POI service initiated by the method of FIG. 3. As shown in FIG. 4, method 400 includes steps 402, 404, 406, 408, 410, and 412. Like method 300, method 400 will be described for purposes of discussion using system 100 of FIG. 1 and the example GUI 200 of FIGS. 2A-2D, as described above. However, method 400 is not intended to be limited thereto. Accordingly, the steps of method 400 may be performed by, for example, a client application executable at a mobile computing device of a user, e.g., any of user devices 110 (including mobile device 115, GPS device 120, computer 125, and vehicle navigation system 130) of FIG. 1, as described above. Alternatively, the steps of method 400 may be performed by a server hosting a mapping application or service, e.g., mapping services server 145 of FIG. 1, as described above.

Once an exit action has been inferred and the exit service initiated (in step 316 of method 300 of FIG. 3, as described above), method 400 begins in step 402, which includes obtaining traffic data based on a predetermined route and point of deviation therefrom. As noted previously, the predetermined route may be along a portion of a highway and the point of deviation may be a highway exit location. However, it should be noted that the techniques disclosed herein are not intended to be limited to highways and highway exit locations, and that these techniques may be applied to any predetermined route along a public or private roadway along with any predefined location or "breakpoint" along the route. In step 404, POI data related to one or more POIs associated with the deviation point, e.g., exit location, is obtained. Such POI data may be obtained via a network from a POI database service (e.g., hosted at POI database server of FIG. 1, as described above).

In an example, as described above, a mobile application executable at a user's mobile device may be configured to monitor the user's progress along the predetermined route of travel and detect any points of deviation away from the prescribed path, e.g., taking an exit off the highway for an unscheduled stop. When the mobile application in this example detects such a deviation from the prescribed route, the application may automatically infer that the mobile user is exiting the highway. Further, the mobile application may infer that the user is exiting for a particular reason (e.g., to stop at a particular POI located nearby and associated with the exit location). This further inference may be based on a probability score calculated in step 406. The probability score may be calculated in step 406 based on the obtained traffic data (step 402) and POI data (step 404).

Method 400 may then proceed to step 408, in which different routing options may be provided for the user based on the calculated probability. Such routing options may be provided via, for example, a GUI (e.g., GUI 200 of FIGS. 2A-2D, as described above) to be displayed using a display device of the user's mobile computing device. The routing options may relate to, for example, POIs that are known to be popular (e.g., based on user ratings) and located near the exit location. The user may select an appropriate routing option related to one or more of the nearby POIs and relevant routing information may be provided accordingly (e.g., for display via GUI 200) in step 410. In some implementations, method 400 may also include a step 412, in which a popularity score or ranking associated with the particular POI(s) are updated based on the user's selection of the corresponding routing option(s), e.g., via GUI 200. The popularity score for each POI may be, for example, a cumulative popularity score based on the number of times that users in general have selected routing options including detours or breakpoints involving the particular POI. The updated popularity score for the individual POIs associated with an exit location may then be used to update the overall popularity score or ranking associated with the exit location itself (e.g., in step 318 of method 300, as described above).

Figure 5:
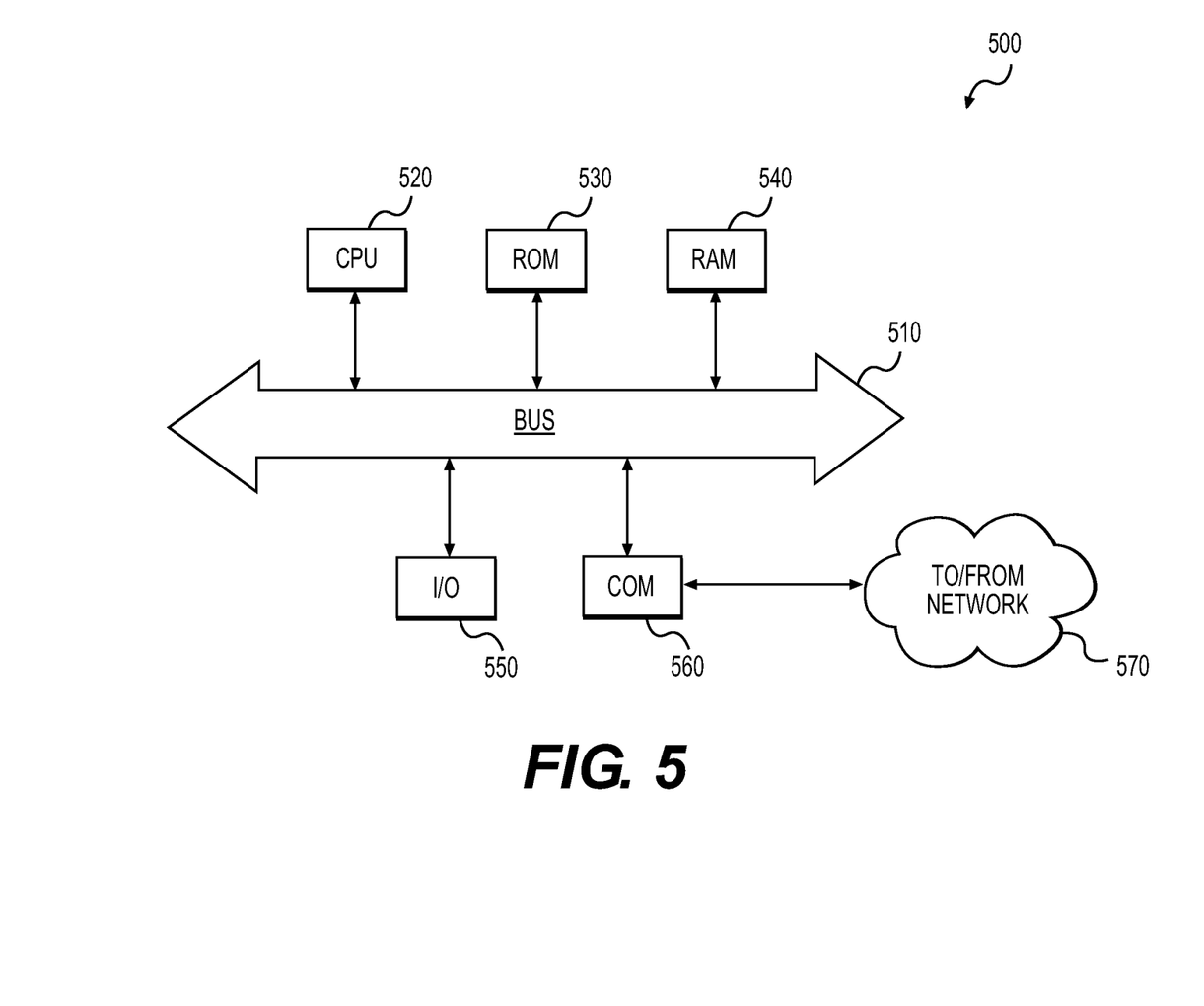
FIG. 5 is a block diagram of an exemplary computer system in which embodiments of the present disclosure may be implemented.

FIG. 5 provides a functional block diagram illustration of general purpose computer hardware platforms. FIG. 5 illustrates a network or host computer platform 500, as may typically be used to implement a server, for example, any of servers 135, including mapping services server system 145, break point server 150, or POI database server 155, of FIG. 1, as described above. It is believed that those skilled in the art are familiar with the structure, programming and general operation of such computer equipment and as a result the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage and data storage for various data files to be processed and/or communicated by the platform such as ROM 530 and RAM 540, although the server 500 often receives programming and data via network communications 570. The hardware elements, operating systems and programming languages of such equipment are conventional in nature, and it is presumed that those skilled in the art are adequately familiar therewith. The server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for identifying deviation points along a route of travel, the method comprising:
    monitoring a current location of a mobile device of a user traveling along a portion of a predetermined route toward a specified destination location;
    detecting a point of deviation from which the mobile device of the user moves away from the predetermined route based on the monitoring step;
    comparing the detected point of deviation to a database of one or more highway exits and inferring the user's intent to stop at one of the highway exits proximate to the detected point of deviation based on the comparison;
    obtaining information related to one or more points of interest associated with the detected point of deviation or the highway exit proximate to the detected point of deviation; and
    interrupting routing of the user to the specified destination location to instead provide routing options to one or more of the points of interest associated with the detected point of deviation or the highway exit, for display to the user via a display of the mobile device based on the obtained information.

2. The method of claim 1, wherein the one or more points of interest are located within a predetermined distance or drive time from the point of deviation.

3. The method of claim 1, wherein the mobile device is a dedicated geographic positioning system (GPS) navigation device including route guidance features.

4. The method of claim 1, further comprising:
    inferring an intent of the user to visit at least one of the one or more points of interest associated with the point of deviation based on the obtained information.

5. The method of claim 4, wherein the inferring step comprises:
    determining whether a total number of the one or more points of interest associated with the detected point of deviation exceeds a predetermined threshold quantity; and
    inferring the user's intent to visit at least one of the one or more points of interest based on the determination.

6. The method of claim 4, wherein the inferring step comprises:
    obtaining traffic data associated with the portion of the predetermined route;

obtaining data related to the one or more points of interest associated with the point of deviation;

calculating a probability score representing a likelihood of the user's intent to visit at least one of the one more points of interest based on the obtained traffic data and data related to the one or more points of interest; and inferring the user's intent based on the calculated probability score.

7. The method of claim 4, wherein the inferring step comprises:

determining whether a popularity score associated with the point of deviation exceeds a predetermined threshold value; and inferring the user's intent to visit at least one of the one or more points of interest based on the determination.

8. The method of claim 7, wherein the point of deviation is a predefined geographic location associated with the portion of the predetermined route, and the determining step further comprises:

accessing a database mapping the predefined geographic location corresponding to the detected point of deviation to the associated popularity score.

9. The method of claim 8, wherein the portion of the predetermined route of travel is a highway, and the predefined geographic location corresponding to the point of deviation is an exit located along the highway.

10. The method of claim 9, wherein the predetermined popularity score is based on a number of times the exit has been used as a deviation point by users traveling along the highway during a predetermined period of time.

11. A system for rating deviation points along a route of travel, the system comprising:

a memory having processor-readable instructions stored therein; and a processor configured to access the memory and execute the processor-readable instructions, which when executed by the processor configures the processor to perform a plurality of functions, including functions to:

monitor a current location of a mobile device of a user traveling along a portion of a predetermined route toward a specified destination location;

detect a point of deviation from which the mobile device of the user moves away from the predetermined route based on the monitoring step;

compare the detected point of deviation to a database of one or more highway exits and inferring the user's intent to stop at one of the highway exits proximate to the detected point of deviation based on the comparison;

obtain information related to one or more points of interest associated with the detected point of deviation or the highway exit proximate to the detected point of deviation; and interrupt routing of the user to the specified destination location to instead provide routing options to one or more of the points of interest associated with the detected point of deviation or the highway exit, for display to the user via a display of the mobile device based on the obtained information.

12. The system of claim 11, wherein the one or more points of interest are located within a predetermined distance or drive time from the point of deviation.

13. The system of claim 11, wherein the mobile device is a dedicated geographic positioning system (GPS) navigation device including route guidance features.

14. The system of claim 11, wherein the functions performed by the processor further comprise functions to:

infer an intent of the user to visit at least one of the one or more points of interest associated with the point of deviation based on the obtained information.

15. The system of claim 14, wherein the functions performed by the processor comprise functions to:

determine whether a total number of the one or more points of interest associated with the detected point of deviation exceeds a predetermined threshold quantity; and infer the user's intent to visit at least one of the one or more points of interest based on the determination.

16. The system of claim 14, wherein the functions performed by the processor comprise functions to:

obtain traffic data associated with the portion of the predetermined route;

obtain data related to the one or more points of interest associated with the point of deviation;

calculate a probability score representing a likelihood of the user's intent to visit at least one of the one more points of interest based on the obtained traffic data and data related to the one or more points of interest; and infer the user's intent based on the calculated probability score.

17. The system of claim 14, wherein the functions performed by the processor comprise functions to:

determine whether a popularity score associated with the point of deviation exceeds a predetermined threshold value; and infer the user's intent to visit at least one of the one or more points of interest based on the determination.

18. The system of claim 17, wherein the portion of the predetermined route of travel is a highway, and the predefined geographic location corresponding to the point of deviation is an exit located along the highway.

19. The system of claim 18, wherein the predetermined popularity score is based on a number of times the exit has been used as a deviation point by users traveling along the highway during a predetermined period of time.

20. A non-transitory computer readable medium storing instructions that, when executed by a computer, cause the computer to perform functions to:

monitor a current location of a mobile device of a user traveling along a portion of a predetermined route toward a specified destination location;

detect a point of deviation from which the mobile device of the user moves away from the predetermined route based on the monitoring step;

compare the detected point of deviation to a database of one or more highway exits and inferring the user's intent to stop at one of the highway exits proximate to the detected point of deviation based on the comparison;

obtain information related to one or more points of interest associated with the detected point of deviation or the highway exit proximate to the detected point of deviation; and interrupt routing of the user to the specified destination location to instead provide routing options to one or more of the points of interest associated with the detected point of deviation or the highway exit, for display to the user via a display of the mobile device based on the obtained information.

* * * * *